United States Patent
Liardet et al.

(10) Patent No.: US 7,797,574 B2
(45) Date of Patent: Sep. 14, 2010

(54) CONTROL OF THE EXECUTION OF AN ALGORITHM BY AN INTEGRATED CIRCUIT

(75) Inventors: Pierre-Yvan Liardet, Peynier (FR); Yannick Teglia, Marseille (FR)

(73) Assignee: STMicroelectronics S.A., Montrouge (FR)

( * ) Notice: Subject to any disclaimer, the term of this patent is extended or adjusted under 35 U.S.C. 154(b) by 548 days.

(21) Appl. No.: 11/115,635

(22) Filed: Apr. 27, 2005

(65) Prior Publication Data

US 2005/0251703 A1 Nov. 10, 2005

(30) Foreign Application Priority Data

Apr. 27, 2004 (FR) .................................. 04 50798

(51) Int. Cl.
*G06F 11/00* (2006.01)
(52) U.S. Cl. ....................................................... 714/11
(58) Field of Classification Search .................. 714/17, 714/50, 51, 822, 819, 815; 712/236; 711/11
See application file for complete search history.

(56) References Cited

U.S. PATENT DOCUMENTS

| 4,606,041 | A * | 8/1986 | Kadin ......................... 375/134 |
| 4,908,502 | A * | 3/1990 | Jackson ........................ 235/437 |
| 5,295,258 | A * | 3/1994 | Jewett et al. .................. 714/12 |
| 6,823,473 | B2 * | 11/2004 | Mukherjee .................... 714/10 |
| 6,854,075 | B2 | 2/2005 | Mukherjee et al. |
| 6,931,565 | B2 * | 8/2005 | Hirabayashi ................... 714/4 |
| 2004/0064756 | A1 * | 4/2004 | Kadambi ...................... 714/17 |
| 2004/0153747 | A1 * | 8/2004 | Czajkowski ................... 714/10 |
| 2004/0239397 | A1 * | 12/2004 | Mudge et al. ................ 327/278 |
| 2005/0005203 | A1 * | 1/2005 | Czajkowski ................... 714/47 |
| 2005/0160279 | A1 * | 7/2005 | Henry et al. ................. 713/189 |
| 2005/0246613 | A1 * | 11/2005 | Blaauw et al. .............. 714/763 |
| 2007/0014395 | A1 * | 1/2007 | Joshi et al. .................... 380/28 |
| 2007/0088979 | A1 * | 4/2007 | Pomaranski et al. .......... 714/10 |

(Continued)

FOREIGN PATENT DOCUMENTS

DE 100 42 234 A1 3/2002

(Continued)

OTHER PUBLICATIONS

Gomaa, Scarbrough, Vijaykumar, Pomeranz, Transient-Fault Recovery for Chip Multiprocessors, IEEE Computer Society, Nov.-Dec. 2003, pp. 76-83.*

(Continued)

*Primary Examiner*—Robert Beausoliel
*Assistant Examiner*—Amine Riad
(74) *Attorney, Agent, or Firm*—Lisa K. Jorgenson; James H. Morris; Wolf, Greenfield & Sacks, P.C.

(57) ABSTRACT

A method and a circuit for protecting against possible fault injections a calculation successively performed by several hardware cells of a same electronic element, including: starting a first execution of the calculation; starting a second execution of the same calculation once the first execution has freed a first cell and goes on in a second cell; synchronizing the executions so that the second execution uses a cell only when the first execution has passed to the next cell; and verifying the identity between the two results at the end of the execution of the two calculations.

17 Claims, 1 Drawing Sheet

U.S. PATENT DOCUMENTS

2007/0179733 A1* 8/2007 Clark et al. .................. 702/122
2007/0204137 A1* 8/2007 Tran ............................ 712/214

FOREIGN PATENT DOCUMENTS

DE           100 36 335 A1    2/2003

OTHER PUBLICATIONS

Nahmsuk Oh, Error detection by duplicated instructions in super-scalar processors, IEEE Transactions on Reliability, vol. 51, Issue 1, Mar. 2002.*
J. Orlin Grabbe, The DES Algorithm Illustrated, Apr. 1999.*
Ten H. Lai, Symmetric-Key Encryption.*
Ten H. Lai Symmetric-Key Encryption, (no date available).*

* cited by examiner

CONTROL OF THE EXECUTION OF AN ALGORITHM BY AN INTEGRATED CIRCUIT

BACKGROUND OF THE INVENTION

1. Field of the Invention

The present invention generally relates to the execution of calculation functions by an integrated circuit. The present invention more specifically relates to the control of the execution of an algorithm, especially of cryptography, against attacks by injection of faults aiming at discovering the secret (generally, a key) handled by this algorithm.

2. Discussion of the Related Art

An attack by fault injection consists of introducing a fault into the executed program (for example, blowing up the program counter) or into the handled data to obtain an erroneous result. This fault injection is repeated several times and ends by enabling the attacker to discover the handled secret quantity. For example, for cryptography algorithms (DSA, RSA, DES, AES, etc.), the secret keys can be discovered by means of a pirating causing instruction jumps.

A known technique to protect a program against fault injections consists of calculating a signature (application of a ciphering algorithm to at least a portion of the software code) upon installation or writing of the program. This signature is then stored inside or outside of the integrated circuit executing the program. Then, in the execution of the software code, the exploitation system recalculates a signature based on the same algorithm as that having been used to generate the initial signature. The current signature is then compared with the predetermined signature. A divergence between these two signatures means that the stored program has been modified and thus enables identifying a potential attack, voluntary or incidental. An example of such an integrity control method is described in U.S. Pat. No. 5,442,645, which is incorporated hereby by reference.

Such a solution protects the program, but not the data and, especially, not the handled secret keys. Further, attacks by fault injection such as described in document "DFA of DES with single injection faults" by M. Witterman in IBM Workshop on Security—April 2000, remain efficient on algorithms such as the DES.

To protect the data, a known technique consists of applying a function C for calculating an error-correction code to data D being processed. Before starting a given operation O of the program, this calculation function is applied to the data to be processed to obtain an initial code C(D). At the end of the processing of the data by the operation, the same function C is applied to the result data O(D) and operation O of the program is applied to the initial code C(D). The data have not been modified during the processing if the two results C(O(D)) and O(C(D)) are identical.

A disadvantage of this technique is that it is not applicable to all operations. In particular, it requires for the operation handling the data and for the code calculation function to respect, for valid data, condition C(O(D))=O(C(D)).

Another known solution to control the execution of a program is to perform certain operations twice, to have a redundancy on the data to check the consistency between the two executions. A disadvantage of such a solution is that it requires either doubling the execution time, or doubling the hardware calculation elements.

SUMMARY OF THE INVENTION

The present invention aims at overcoming the disadvantages of known solutions of protection against fault injections in the execution of programs and, more specifically, detecting possible fault injections, be it in the program or in the data.

The present invention also aims at providing a solution which is compatible with an execution on a microcontroller of limited power of smart card type.

To achieve these and other objects, the present invention provides a method for protecting against possible fault injections a calculation successively performed by several hardware cells of a same electronic element, comprising:
 starting a first execution of the calculation;
 starting a second execution of the same calculation once the first execution has freed a first cell and goes on in a second cell;
 synchronizing the executions so that the second execution uses a cell only when the first execution has passed on to the next cell; and
 verifying the identity between the two results at the end of the execution of the two calculations.

According to an embodiment of the present invention, a temporary storage element for storing intermediary results provided by said cells is assigned to each execution.

According to an embodiment of the present invention, at least one temporary storage element is assigned to each hardware cell to store a value to be processed, the result of each cell being stored in a memorization element forming, preferably, the input element of the next cell.

According to an embodiment of the present invention, an error processing is implemented if the two results at the end of the execution are different from each other.

According to an embodiment of the present invention, the method is applied to a DES-type algorithm.

The present invention also provides a microcontroller comprising means for executing the method and a smart card comprising such a microcontroller.

The foregoing and other objects, features, and advantages of the present invention will be discussed in detail in the following non-limiting description of specific embodiments.

DETAILED DESCRIPTION

Figure 1:
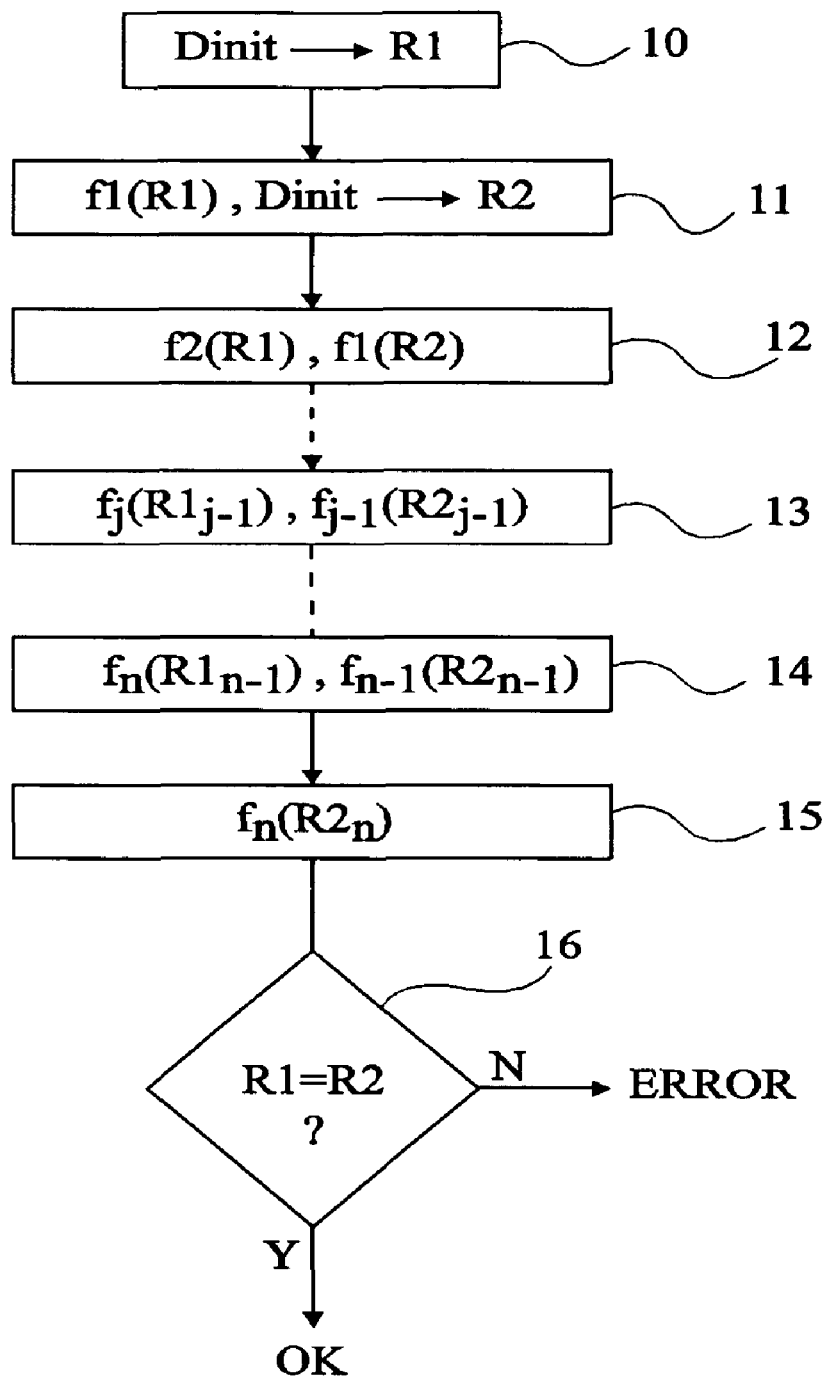
FIG. 1 is a flowchart of an embodiment of the method according to the present invention.

For clarity, only those elements and steps which are necessary to the understanding of the present invention will be described hereafter. In particular, the operators or instructions concerned by the implementation of the present invention have not been described in detail, the present invention applying whatever the type of operator or of instruction. Further, all the components necessary to the execution of a program, be it for a software implementation or by means of a state machine in wired logic, have not been described in detail, their forming using conventional elements.

A feature of the present invention is to execute twice the same calculation with the same data by using, as soon as it is freed by a first execution, a same hardware cell for the same execution. In other words, the two executions provided by the present invention are time-shifted by one cell.

The present invention takes advantage from the fact that the algorithms that handle data, and especially the cryptography algorithms, successively use several hardware cells that they free along the execution of the algorithm.

"Hardware cell" is used to designate, in the meaning of the present invention, a wired OR operation or function, that is, which uses dedicated components. This also assumes that the input-output values of this operation or function are storable, for example, in a temporary register.

According to a preferred embodiment of the present invention, at least one first temporary storage element (for example, one or several registers) is assigned to each of the executions to store, in particular, intermediary results. If necessary, a storage element is assigned to each result to enable the comparison. As an alternative, the first element of each execution stores its result. The number of storage elements is to be adapted to the algorithm and depends, in particular, on the possible need for taking into account one or several previous intermediary results. In practice, the implementation of the present invention doubles the number of intermediary state storage elements with respect to a conventional execution of the considered algorithm. Accordingly, the smaller this number (ideally, a single one), the less the implementation of the present invention is resource consuming.

Designating with F an algorithm executing the n operations $f_1, \ldots, f_i, \ldots f_n$ (i designating the rank of the operation in a first execution), with R1 and R2 two registers (or sets of registers) assigned to the respective intermediary results of two executions of the algorithm, and with $D_{init}$ the data to be processed which must result in data $D_{fin}$ at the end of the processing, the implementation of the present invention may be written as follows.

For simplification, each operation f is assimilated to a time period $t_j$. In fact, the respective durations of operations f may be different from one another, but this has no incidence provided that the same operation is not simultaneously applied to the respective contents of the two registers R1 and R2. It is assumed that registers R1 and R2 contain the data being processed at each end of an operation. The respective contents of registers R1 and R2 at the end of period j will be designated as $R1_j$ and $R2_j$. In fact, due to the execution shift, ranks i and j are equal for the first execution (R1).

FIG. 1 is a flowchart of an embodiment of the method according to the present invention.

Initially (before period $t_1$), at least register R1 contains value $D_{init}$ (block 10, $D_{init} \rightarrow R1$).

During period $t_1$ (block 11, $f_1(R1)$, $D_{init} \rightarrow R2$), first operation $f_1$ is applied to data $D_{init}$ contained in register R1 and, at the end of period $t_1$, register R1 contains data $R1_1 = f_1(D_{init})$. During this period $t_1$, no processing is applied to register R2, lest possibly its loading with data $D_{init}$. Accordingly, $R2_1 = D_{init}$.

During period $t_2$ (block 12, $f_2(R1)$, $f_1(R2)$), second operation $f_2$ is applied to the data of register R1 which, at the end of the period, contains data $R1_2 = f_2(R1_1)$. In parallel, first operation $f_1$ is applied to initial data $D_{init}$ contained in register R2 which, at the end of period $t_2$, then contains data $R2_2 = f_1(D_{init})$.

After, at the end of each time phase $t_j$ (block 13, $f_j(R1_{j-1})$, $f_{j-1}(R2_{j-1})$), registers R1 and R2 respectively contain values $R1_j = f_j(R1_{j-1})$ and $R2_j = f_{j-1}(R2_{j-1})$.

At the end of period $t_n$ (block 14, $f_n(R1_{n-1})$, $f_{n-1}(R2_{n-1})$), the first execution is over and register R1 contains data $R1_n = f_n(R1_{n-1})$. If the execution has occurred properly, $R1_n = D_{fin}$. On the side of register R2, the penultimate operation $f_{n-1}$ is applied during period $t_n$ to result in data $R2_n = f_{n-1}(R2_{n-1})$.

The implementation of the present invention requires at least one additional period t (block 15, $f_n(R2_n)$) to end the second execution. At the end of this additional period $t_{n+1}$, register R2 contains data $R2_{n+1} = f_n(R2_n)$. Here again, if the execution has occurred properly, $R2_{n+1} = D_{fin}$.

It is then enough, at the end of period $t_{n+1}$, to compare (block 16, R1=R2?) the respective contents of registers R1 and R2. In case of an identity (output Y), it can be concluded therefrom that the result is reliable OK (that the executions have not been disturbed). In the opposite case (output N), this means that an attack (or an incidental error) ERROR has occurred.

An example of implementation of the present invention will be described hereafter in relation with a specific example of application to the DES algorithm. However, the present invention more specifically applies to any algorithm successively using several hardware cells. For example, the present invention also applies to the AES algorithm.

An algorithm of DES type decomposes in ciphering rounds (ROUND) in which data and keys are handled. This algorithm is described, for example, in document "Federal Information Processing Standards Publication" 46-2, Dec. 30, 1993, which is incorporated hereby by reference.

Each round can be broken-up as follows, noting i the rank of the round, K the key, R the right-hand portion of the data word to be processed, L the left-hand portion of the data word, and T the variable being processed.

T=E®, where E designates the expansion of data R over all the bits of the word;

T=T xor K(i), where xor designates the XOR function and K(i) designates the key of round i;

T=Sbox(T), where Sbox designates a substitution table;

T=P(T), where P designates a permutation;

T=T xor L;

L=R; and

R=T.

In terms of time, the execution of a round of rank i can be represented as in table 1 hereafter, where t designates the clock cycle.

TABLE 1

| Operation | Content of the registers | | |
|---|---|---|---|
| | temporary register | R | |
| | $R_{i-1}$ | $R_{i-1}$ | i − 1 |
| T = E($R_{i-1}$) | E($R_{i-1}$) | | |
| T = T xor K(i) | E($R_{i-1}$) xor K(i) | | |
| T = Sbox(T) | Sbox(E($R_{i-1}$) xor K(i)) | | |
| T = P(T) | P(Sbox(E($R_{i-1}$) xor K(i))) | | |
| T = T xor L | P(Sbox(E($R_{i-1}$) xor K(i))) xor L | | |
| L = R | | | i − 1 |
| R = T | | P(Sbox(E($R_{i-1}$) xor K(i))) xor L | |

Table 2 hereafter illustrates the implementation of the present invention on a ciphering round of the DES algorithm. The same notations as previously have been used by being assigned with a 1 for the first execution and with a 2 for the second execution.

TABLE 2

| cycle | Execution 1 Operation | Execution 2 Operation | Register content | | |
|---|---|---|---|---|---|
| | | | T1 | T2 | R |
| | | | $R_{i-1}$ | $R_{i-1}$ | $R_{i-1}$ | i − 1 |
| | T1 = E(T1) | | E($R_{i-1}$) | | |
| | T1 = T1 xor K(i) | T2 = E(T2) | E($R_{i-1}$) xor K(i) | E($R_{i-1}$) | |

TABLE 2-continued

| cycle | Execution 1 Operation | Execution 2 Operation | T1 | T2 | R |
|---|---|---|---|---|---|
| | T1 = Sbox(T1) | T2 = T2 xor K(i) | Sbox(E($R_{i-1}$)) xor K(i)) | E($R_{i-1}$) xor K(i) | |
| | T1 = P(T1) | T2 = Sbox(T2) | P(Sbox(E($R_{i-1}$)) xor K(i)) | Sbox(E($R_{i-1}$)) xor K(i)) | |
| | T1 = T1 xor L | T2 = P(T2) | P(Sbox(E($R_{i-1}$)) xor K(i)) xor L | P(Sbox(E($R_{i-1}$)) xor K(i)) | |
| | | T2 = T2 xor L | | P(Sbox(E($R_{i-1}$)) xor K(i)) xor L | |
| | T2 = T1 ? | | | | $i-1$ |
| | L = R | | | | |
| | R = T1 | | | | P(Sbox(E($R_{i-1}$)) xor K(i)) xor L |

As compared to the conventional execution, the identity of the contents of registers T1 and T2 is tested before updating registers R and L. As can be seen, two additional cycles are necessary (one for the testing and one to support the shift). In table 2, it is assumed that the testing of cycle 7 validates the execution. In the opposite case, cycles 8 and 9 are not executed.

As an alternative, the testing is not performed at the end of each round i, but at the end of the execution of all rounds. In this case, the number of additional cycles is limited to n+1 (n being the number of rounds) instead of 2n.

It should be noted that the implementation of the present invention is compatible with an algorithm using more than once a same cell. If this use is sufficiently spaced apart in time, this requires no specific precaution. However, if this use is close, for example, if a same cell is used twice successively, the two uses are then considered as a single one and it is awaited for this cell to be freed. As an alternative, this cell is used a first time for the first execution. Then it is awaited for it to have been used by the second execution before using it back for the first one. Each execution is then temporarily put to wait while the cell is used for the other one. The selection of the implementation mode depends on the duration of execution of the cell with respect to the previous or next cells. In particular, using it twice successively for a same execution does not lengthen the method if the previous step alone is twice as long (the data of the second execution would then anyway not be ready before the end of the two uses for the first execution).

After detection of two different results, any conventional action may be taken. For example, the final result is not taken into account for the rest of the application. According to another example, the electronic element, for example, the smart card, is blocked.

An advantage of the present invention is that its implementation requires but little additional (time or hardware) resources with respect to an unprotected execution. Indeed, the lengthening of the total duration, linked to the implementation of the present invention with respect to two executions in parallel, is limited to the time of execution of a single cell (that which takes the most time). Further, the extra hardware elements, with respect to two successive executions, are at most one element for storing the intermediary results of the second execution (the storage of the results of the two executions for comparison being already present for two successive executions).

Of course, the present invention is likely to have various alterations, modifications, and improvements which will readily occur to those skilled in the art. In particular, the dividing of the algorithm (the selection of the hardware cells) is within the abilities of those skilled in the art according to the application and based on the functional indications given hereabove. Further, the practical implementation of the present invention by software means to execute the verification method and, especially, manage the registers and the operation sequencing is within the abilities of those skilled in the art and calls forth usual programming notions.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for cryptographically protecting against possible fault injections during an execution of a calculation, the calculation comprising operations successively performed by a sequence of hardware cells of a same electronic element, the method comprising:

starting a first execution of the calculation in a first hardware cell;

prior to completing the first execution of the calculation, starting a second execution of the same calculation in the first hardware cell, the second execution started once the first execution has freed the first hardware cell and goes on in a second hardware cell;

synchronizing the executions so that the second execution uses each intermediate hardware cell in the sequence only when the first execution has passed from said intermediate hardware cell to a next hardware cell in the sequence; and verifying, after the end of the first and second executions, the identity between a first result produced by the first execution and a second result produced by the second execution.

2. The method of claim 1, wherein a temporary storage element for storing intermediary results provided by said hardware cells is assigned to each execution.

3. The method of claim 1, wherein at least one temporary storage element is assigned to each hardware cell to store a value to be processed, the result of each hardware cell being stored in a storage element forming the input element of the next hardware cell.

4. The method of claim 1, wherein an error processing is implemented if the first result and the second result are different from each other.

5. The method of claim 1, wherein the method is applied to a DES-type algorithm.

6. A microcontroller comprising means for executing the method of claim 1.

7. A smart card comprising the microcontroller of claim 6.

8. A method for cryptographically detecting one or more faults that occur when executing an algorithm on a plurality of hardware cells of an electronic element, the algorithm comprising a first operation and a second operation, the method comprising:

in a first execution of the algorithm:
    executing the first operation on a first hardware cell of the plurality of hardware cells;
    executing the second operation on a second hardware cell of the plurality of hardware cells; and
in a second execution of the algorithm:
    executing the first operation on the first hardware cell after the first hardware cell has finished the first operation of the first execution and prior to completing the first execution;
    executing the second operation on the second hardware cell after the second hardware cell has finished the second operation of the first execution; and
after completing both the first and second executions, comparing first output data produced by the first execution with second output data produced by the second execution.

9. The method of claim 8, wherein a first temporary storage element for storing intermediate values provided by the plurality of hardware cells is assigned to the first execution, and a second temporary storage element for storing intermediate values provided by the plurality of hardware cells is assigned to the second execution.

10. The method of claim 9, further comprising:
in the first execution:
    storing, in the first temporary storage element, first intermediate values computed by the first hardware cell to make the first intermediate values available to the second hardware cell;
in the second execution:
    storing, in the second temporary storage element, second intermediate values computed by the first hardware cell to make the second intermediate values available to the second hardware cell.

11. The method of claim 8, further comprising:
performing error processing in response to detecting a difference between the first output data and the second output data.

12. The method of claim 11, wherein the error processing comprises discarding the first output data and the second output data.

13. The method of claim 11, wherein the error processing comprises blocking the electronic element from subsequent use.

14. The method of claim 8, wherein the algorithm is a symmetric key encryption algorithm.

15. The method of claim 14, wherein the algorithm is a block cipher symmetric key encryption algorithm.

16. The method of claim 1, wherein each of the hardware cells performs an operation or function using dedicated hardware components.

17. The method of claim 8, wherein each of the plurality of hardware cells performs an operation or function using dedicated hardware components.

* * * * *